(12) United States Patent
Ponce de Leon et al.

(10) Patent No.: US 11,487,415 B1
(45) Date of Patent: Nov. 1, 2022

(54) SCHEDULE DENSITY ZOOMING

(71) Applicant: PMA Technologies, LLC, Ann Arbor, MI (US)

(72) Inventors: Gui Ponce de Leon, Ann Arbor, MI (US); Vivek Puri, Scottsdale, AZ (US); Seve Ponce de Leon, Ann Arbor, MI (US); Sergio Ponce de Leon, Ann Arbor, MI (US)

(73) Assignee: PMA TECHNOLOGIES, LLC, Ann Arbor, MI (US)

( * ) Notice: Subject to any disclaimer, the term of this patent is extended or adjusted under 35 U.S.C. 154(b) by 0 days.

(21) Appl. No.: 17/585,954

(22) Filed: Jan. 27, 2022

Related U.S. Application Data

(60) Provisional application No. 63/184,387, filed on May 5, 2021, provisional application No. 63/167,322, filed
(Continued)

(51) Int. Cl.
 *G06F 3/0481* (2022.01)
 *G06F 3/04845* (2022.01)
 (Continued)

(52) U.S. Cl.
 CPC ........ *G06F 3/04845* (2013.01); *G06F 3/0481* (2013.01); *G06Q 10/063118* (2013.01);
 (Continued)

(58) Field of Classification Search
 CPC .. G06F 16/2365; G06F 16/282; G06F 3/0482; G06F 3/0481; G06F 3/0485; G06F 16/211; G06F 16/2246; G06F 16/26; G06F 16/9024; G06F 9/5061; G06F 9/546; G06F 16/1873; G06F 16/2343; G06F 16/273; G06F 9/451; G06F 11/3688; G06F 11/3696; G06F 16/283; G06F 3/0483; G06F 3/04842; G06F 16/248; G06F 16/287; G06F 16/9027; G06F 16/904; G06F 16/957; G06F 16/958; G06F 3/04812; G06F 3/04815; G06F 3/0486; G06F 40/134; G06F 40/137; G06F 40/143; G06F 40/166; G06F 40/174; G06F 15/825; G06F 15/82; G06F 12/0811; G06F 15/7867; G06F 9/3005; G06F 9/4494
 See application file for complete search history.

(56) References Cited

U.S. PATENT DOCUMENTS

| 2011/0270836 A1* | 11/2011 | Yang | ............. G06Q 10/06 707/E17.089 |
| 2017/0323028 A1* | 11/2017 | Jonker | ............. G06F 16/9024 |

* cited by examiner

*Primary Examiner* — Rayeez R Chowdhury
(74) *Attorney, Agent, or Firm* — Carlson, Gaskey & Olds, P.C.

(57) ABSTRACT

An interactive and automated summarized schedule on a digital canvas includes a hierarchy of logic-tied schedule densities generated from source schedule activities and for which there is the ability in real-time to zoom in/out among the hierarchy of logic-tied schedule densities. For example, the hierarchy of logic-tied schedule densities is generated in response to and as the timescale (e.g., grid spacing) is compressed or stretched. This permits users to "zoom in" and "zoom out" on the digital canvas to observe the schedule activities individually or at various levels of summary groups that are summed-up from underlying individual activities, all while maintaining logic-relationships between the summarized groups.

20 Claims, 17 Drawing Sheets

Related U.S. Application Data on Mar. 29, 2021, provisional application No. 63/142,042, filed on Jan. 27, 2021, provisional application No. 63/142,043, filed on Jan. 27, 2021.

(51) Int. Cl.
*G06Q 10/06* (2012.01)
*G06T 11/20* (2006.01)

(52) U.S. Cl.
CPC .. *G06T 11/206* (2013.01); *G06F 2203/04806* (2013.01); *G06T 2200/24* (2013.01)

THE GRAPHICAL PATH METHOD ZOOMING UP CONCORDANT SUM-UP LOGIC ALGORITHM (PART I)

| | START & FINISH CHILDREN LINKED IN THE SOURCE SCHEDULE | | | | | | | PARENT ACTV'S | | SUM-UP LOGIC BETWEEN PREDECESSOR PARENT AND SUCCESSOR PARENT | | | |
|---|---|---|---|---|---|---|---|---|---|---|---|---|---|
| | PRED PARENT | | SUCC PARENT | | LOGIC IN SOURCE SCHDULE | | | PRED | SUCC | | | | |
| | Child | Dur | Child | Dur | Type | Offset | Gap | Dur | Dur | Type | Offset/Lag | Offset 2 | Gap |
| 1 | FINISH | a | START | b | fs | d | g | A | B | FS | d | -- | g |
| 2 | FINISH | a | START | b | ss | s | g | A | B | SS | A-a+s | -- | g |
| 3 | FINISH | a | START | b | ff | f | g | A | B | FF | B-b+f | -- | g |
| 4 | START | a | START | b | fs | d | g | A | B | SS | a+d | -- | g |
| 5 | START | a | START | b | ss | s | g | A | B | SS | s | -- | g |
| 6 | START | a | START | b | ff | f | g | A | B | SF | a | B-b+f | g |
| 7 | FINISH | a | FINISH | b | fs | d | g | A | B | FF | *d+b | -- | g |
| 8 | FINISH | a | FINISH | b | ss | s | g | A | B | SF | A-a+s | b | g |
| 9 | FINISH | a | FINISH | b | ff | f | g | A | B | FF | f | -- | g |
| 10 | START | a | FINISH | b | fs | d | g | A | B | SF | A+**d | b | g |
| 11 | START | a | FINISH | b | ss | s | g | A | B | SF | s | b | g |
| 12 | START | a | FINISH | b | ff | f | g | A | B | SF | a | f | g |

*Logic Pattern 7, the precedessor's calendar is assigned to the FS ofset "d," and the successor calendar applies to the FF offset "f"
**Logic Pattern 10, the FS ofset "d" calendar remains as in the source schedule

FIG.3

| THE GRAPHICAL PATH METHOD *ZOOMING UP CONCORDANT* SF LINK AVOIDANCE ALGORITHM (PART II) | | | | | | | | | | | | |
|---|---|---|---|---|---|---|---|---|---|---|---|---|
| *START & FINISH* CHILDREN LINKED IN THE SOURCE SCHEDULE | | | | | | | PARENT ACTV'S | | *SUM-UP* LOGIC BETWEEN PREDECESSOR PARENT AND SUCCESSOR PARENT | | | |
| PRED PARENT | | SUCC PARENT | | LOGIC IN SOURCE SCHDULE | | | PRED | SUCC | | | | |
| Child | Dur | Child | Dur | Type | Offset | Gap | Dur | Dur | Type | Offset/Lag | Offset/Lag | Gap |
| 6 | | | | | | | | | | | | |
| START | a | START | b | ff | f | g | A | B | SF | a | B−b+f | g |
| | | | | | | | | A2 | Type | A1 Duration | A2 Duration | Gap |
| | | | | | | | A1 | | FS | a | A−A1 | 0 |
| | | | | | | | | B | Type | Lag 1 | Lag 2 | Gap |
| | | | | | | | A1 | | FF | B−b+f | N/A | G6 |
| 8 | | | | | | | | | | | | |
| FINISH | a | FINISH | b | ss | s | g | A | B | SF | A−a+s | b | g |
| | | | | | | | | A2 | Type | A1 Duration | A2 Duration | Gap |
| | | | | | | | A1 | | FS | A−a+s | A−A1 | 0 |
| | | | | | | | | B | Type | Lag 1 | Lag 2 | Gap |
| | | | | | | | A1 | | FF | Lag 1 | N/A | g |
| 10 | | | | | | | | | | | | |
| START | a | FINISH | b | fs | d | g | A | B | SF | a | b | G10 |
| | | | | | | | | A2 | Type | A1 Duration | A2 Duration | Gap |
| | | | | | | | A1 | | FS | a | A−A1 | 0 |
| | | | | | | | | B | Type | Lag 1 | Lag 2 | Gap |
| | | | | | | | A1 | | FF | b | N/A | g |
| 11 | | | | | | | | | | | | |
| START | a | FINISH | b | ss | s | g | A | B | SF | s | b | G11 |
| | | | | | | | | A2 | Type | A1 Duration | A2 Duration | Gap |
| | | | | | | | A1 | | FS | s | A−A1 | 0 |
| | | | | | | | | B | Type | Lag 1 | Lag 2 | Gap |
| | | | | | | | A1 | | FF | b | N/A | g |
| 12 | | | | | | | | | | | | |
| START | a | FINISH | b | ff | f | g | A | B | SF | a | f | G12 |
| | | | | | | | | A2 | Type | A1 Duration | A2 Duration | Gap |
| | | | | | | | A1 | | FS | a | A−a | 0 |
| | | | | | | | | B | Type | Lag 1 | Lag 2 | Gap |
| | | | | | | | A1 | | FF | f | N/A | g |

FIG.4

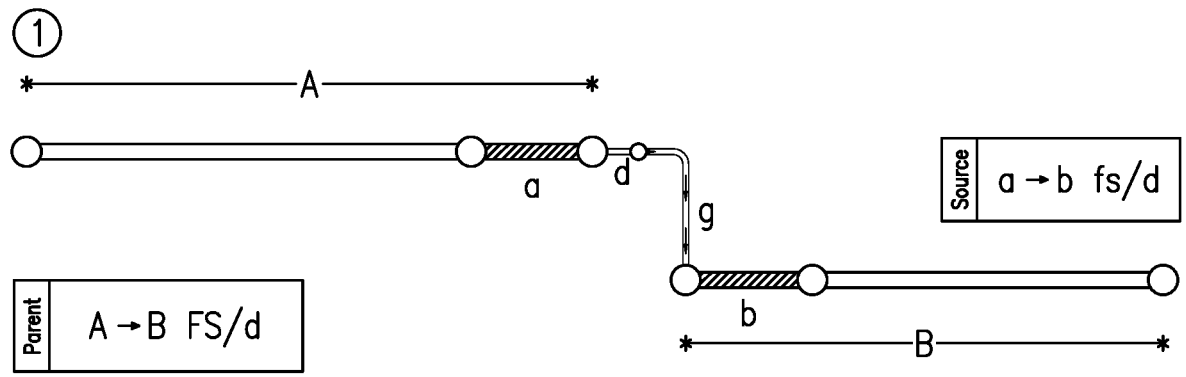
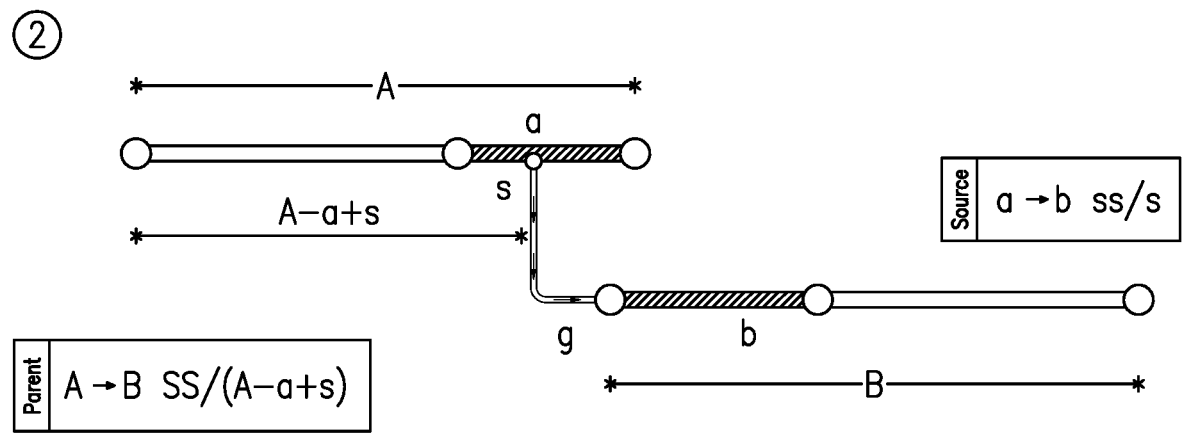
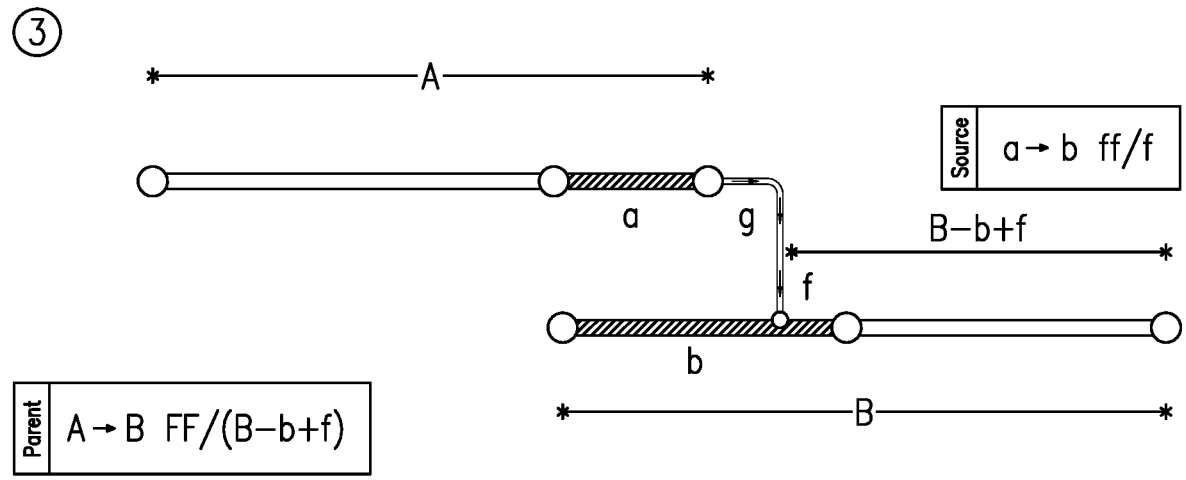
FIG.5

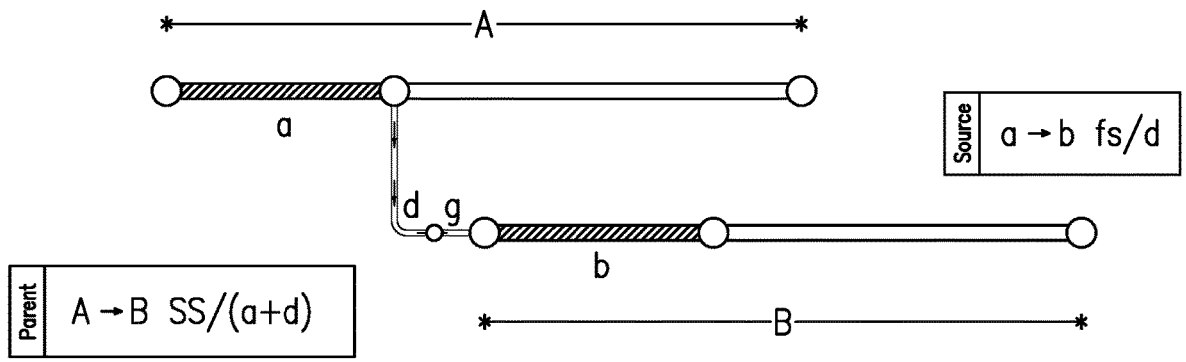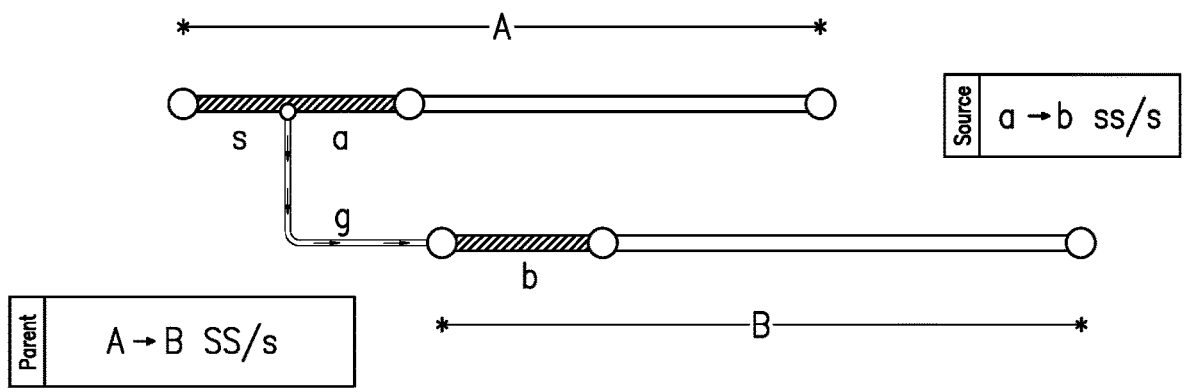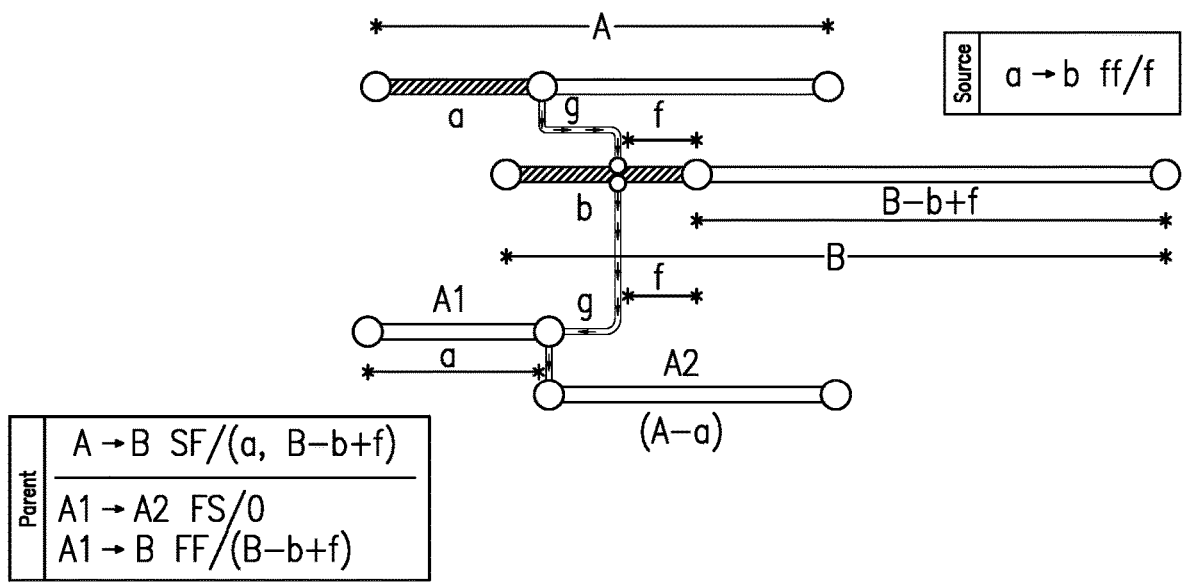
FIG.6

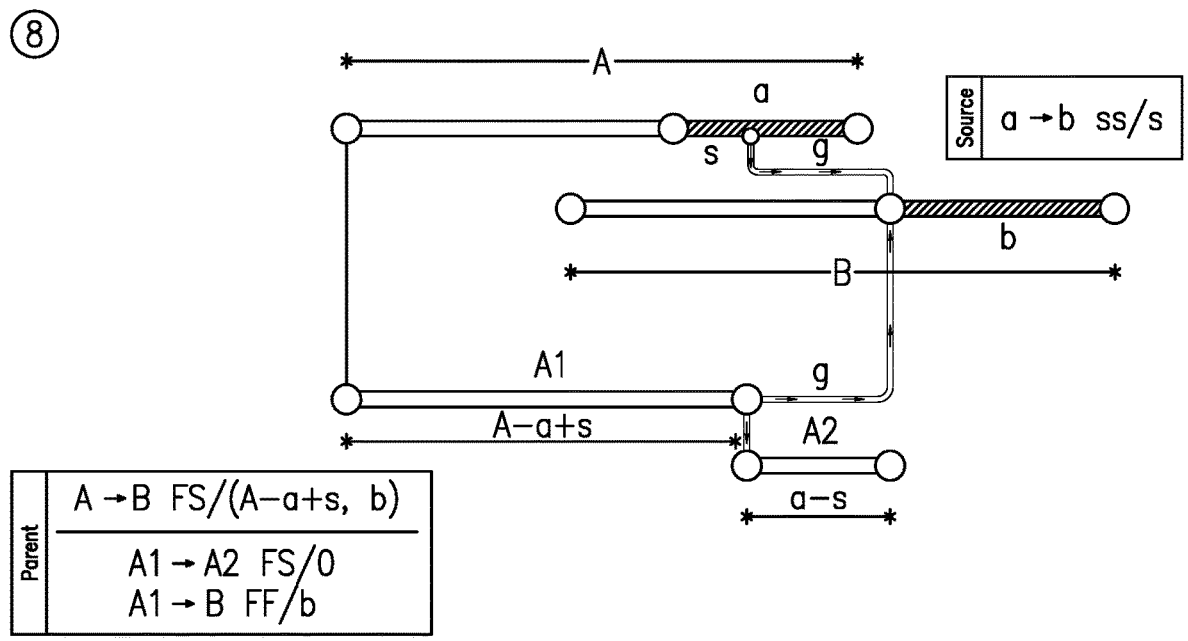
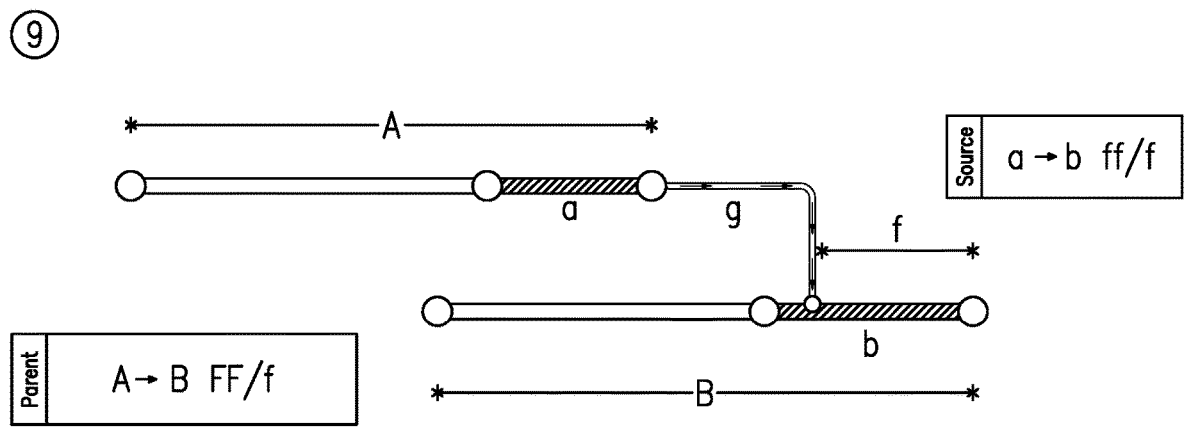
FIG.7

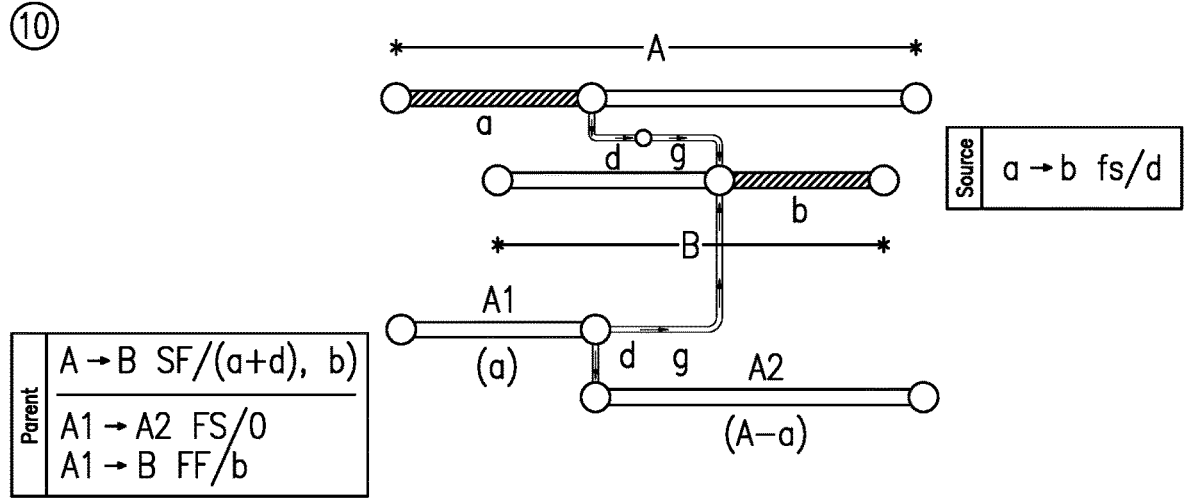
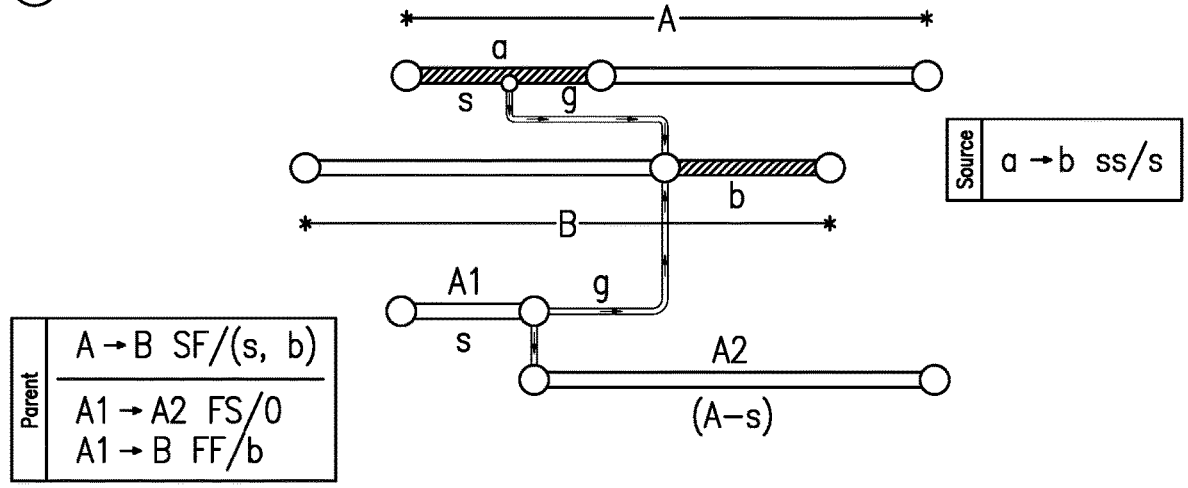
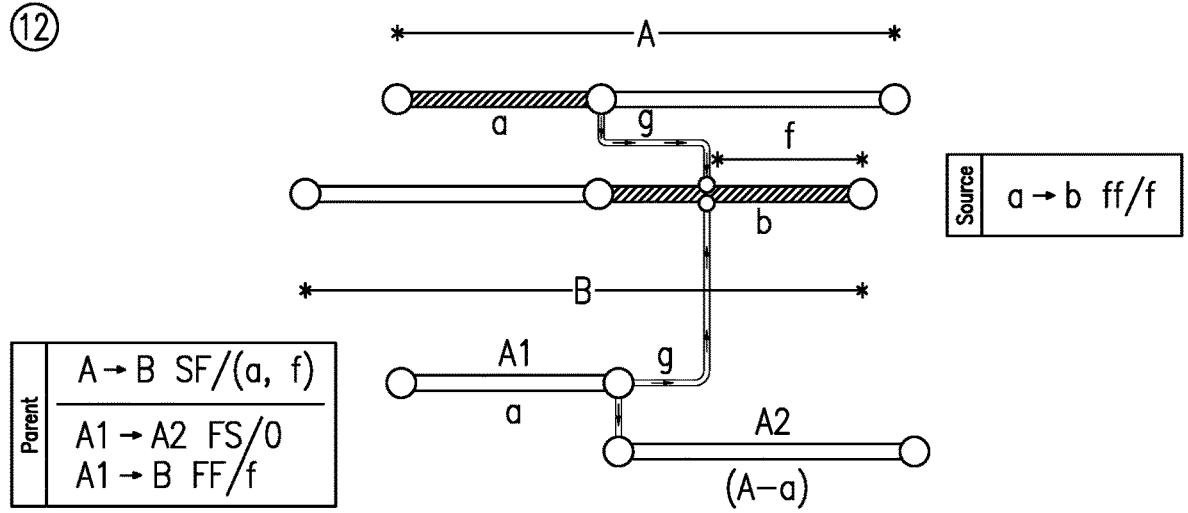
FIG.8

THE GRAPHICAL PATH METHOD ZOOMING UP CONCORDANT SUM-UP LOGIC ALGORITHM (PART III)

| | LINK WITH INTERMEDIATE CHILD IN THE SOURCE SCHEDULE | | | | | | | | PARENT ACTV'S | | ROLL-UP LOGIC from PREDECESSOR PARENT to SUCCESSOR PARENT | | |
|---|---|---|---|---|---|---|---|---|---|---|---|---|---|
| | PRED PARENT | | | SUCC PARENT | | | LINK IN SOURCE SCHDULE | | PRED | SUCC | | | |
| | Child | Dur | α | Child | Dur | β | Type | Offset | Gap | Dur | Dur | Type | Offset/Lag | Offset 2 | Gap |
| 1 | FINISH | a | | INTERM | m | β | fs | d | g | A | B | FF | d+m+β | -- | g |
| 2 | FINISH | a | | INTERM | m | β | ss | s | g | A | B | SF | A−a+s | m+β | g |
| 3 | FINISH | a | | INTERM | m | β | ff | f | g | A | B | FF | f+β | -- | g |
| 4 | INTERM | m | β | FINISH | b | | fs | d | g | A | B | SF | A−β | d+b | g |
| 5 | INTERM | m | β | FINISH | b | | ss | s | g | A | B | SF | A−β−m+s | b | g |
| 6 | INTERM | m | β | FINISH | b | | ff | f | g | A | B | SF | A−β | f | g |
| 7 | START | a | | INTERM | m | β | fs | d | g | A | B | SF | a | d+m+β | g |
| 8 | START | a | | INTERM | m | β | ss | s | g | A | B | SF | s | m+β | g |
| 9 | START | a | | INTERM | m | β | ff | f | g | A | B | SF | a | f+β | g |
| 10 | INTERM | m | α | START | b | | fs | d | g | A | B | SS | α+m+d | -- | g |
| 11 | INTERM | m | α | START | b | | ss | s | g | A | B | SS | α+s | -- | g |
| 12 | INTERM | m | α | START | b | | ff | f | g | A | B | SF | α+m | f+β | g |

α is days, using the intermediate activity calendar, to the start of its parent activity
β is days, using the intermediate activity calendar, to the finish of its parent activity

FIG.9

| THE GRAPHICAL PATH METHOD ZOOMING UP CONCORDANT SF LINK AVOIDANCE ALGORITHM – 5/8 CASES (PART IV) ||||||||||||||
|---|---|---|---|---|---|---|---|---|---|---|---|---|
| LINK FROM/TO INTERMEDIATE CHILD IN THE SOURCE SCHEDULE |||||||| PARENT ACTV'S || SUM-UP LOGIC BETWEEN PREDECESSOR PARENT AND SUCCESSOR PARENT ||||
| PRED PARENT || SUCC PARENT || LINK IN SOURCE SCHDULE ||| PRED | SUCC |||||
| Child | Dur | Child | Dur | Type | Offset | Gap | Dur | Dur | Type | Offset/Lag | Offset/Lag | Gap |
| FINISH | a | INTERM | m | ss | s | g | A | B | SF | A−a+s | m+b | g |
|  |  |  |  |  |  |  | A1 | A2 | Type FS | A1 Duration A−a+s | A2 Duration A−A1 | 0 |
|  |  |  |  |  |  |  | A1 | B | Type FF | Lag 1 m+β | Lag 2 N/A | G6 |
| INTERM | m | FINISH | b | fs | d | g | A | B | SF | A−β | d+b | g |
|  |  |  |  |  |  |  | A1 | A2 | Type FS | A1 Duration A−β | A2 Duration β | 0 |
|  |  |  |  |  |  |  | A1 | B | Type FF | Lag 1 d+b | Lag 2 N/A | g |
| INTERM | m | FINISH | b | ss | s | g | A | B | SF | A−β−m+s | b | g |
|  |  |  |  |  |  |  | A1 | A2 | Type FS | A1 Duration A−β−m+s | A2 Duration m−s+β | 0 |
|  |  |  |  |  |  |  | A1 | B | Type FF | Lag 1 b | Lag 2 N/A | g |
| INTERM | m | FINISH | b | ff | f | g | A | B | SF | A−β | f | G11 |
|  |  |  |  |  |  |  | A1 | A2 | Type FS | A1 Duration A−β | A1 Duration β | 0 |
|  |  |  |  |  |  |  | A1 | B | Type FF | Lag 1 f | Lag 2 N/A | g |
| START | a | INTERM | m | fs | d | g | A | B | SF | a | d+m+β | G12 |
|  |  |  |  |  |  |  | A1 | A2 | Type FS | a | A2 Duration A−a | 0 |
|  |  |  |  |  |  |  | A1 | B | Type FF | Lag 1 d+m+β | Lag 2 N/A | g |

β is days, using the intermediate activity calendar, to the finish of its parent activity

FIG.10

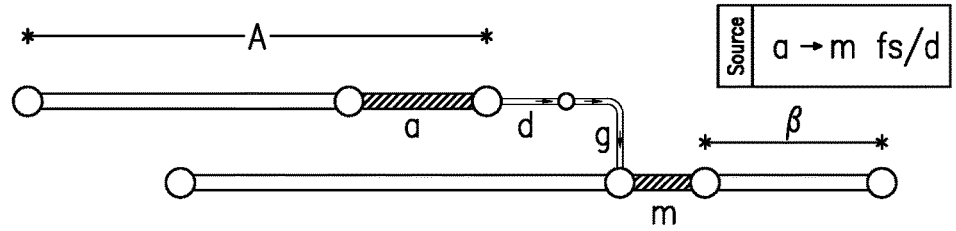
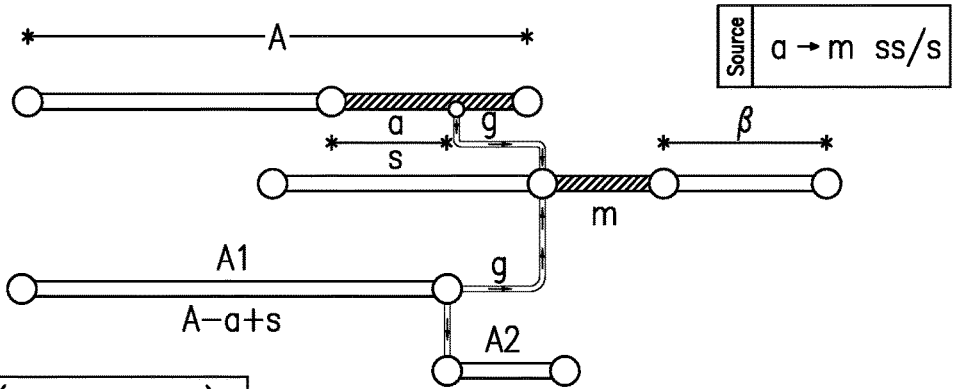
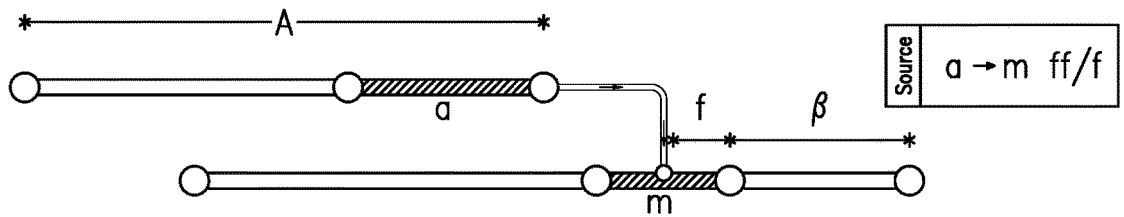
FIG.11

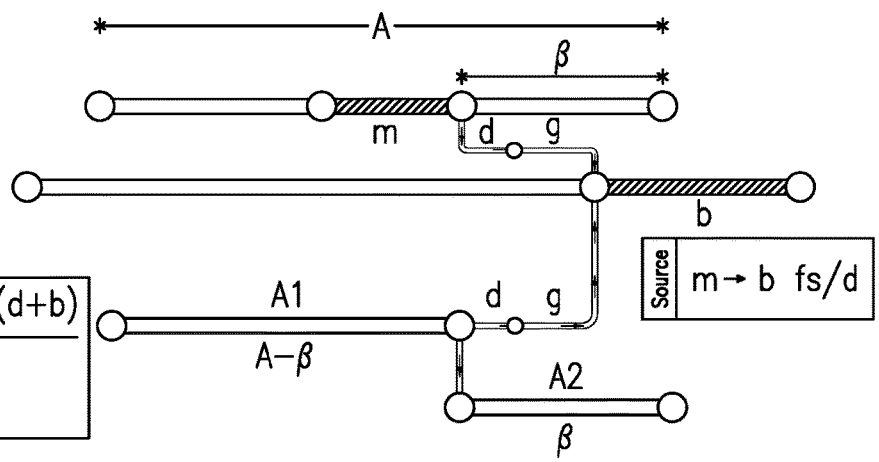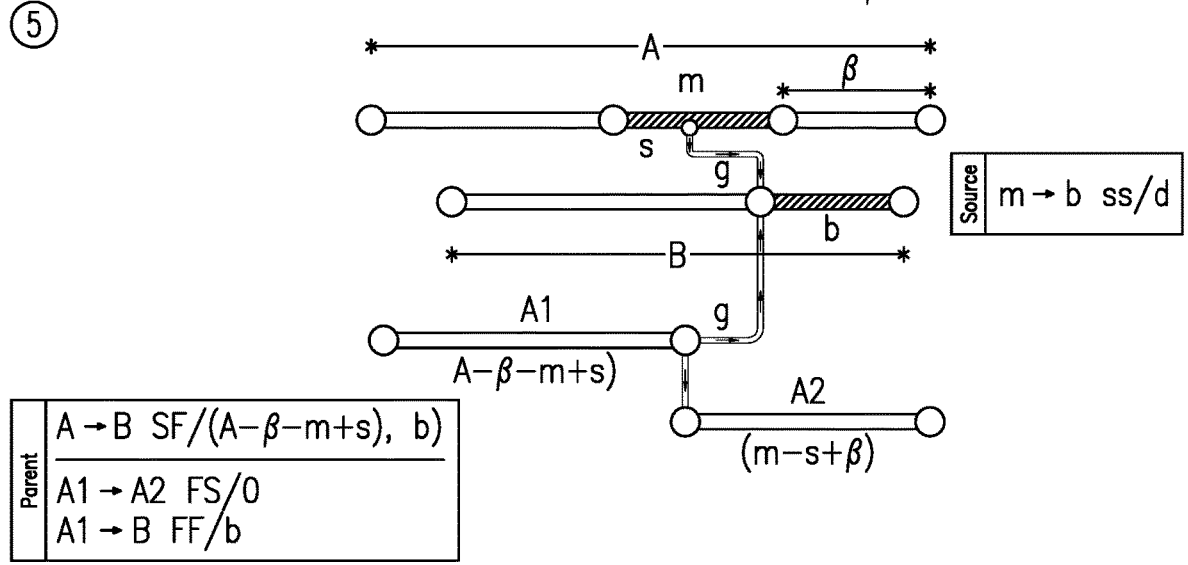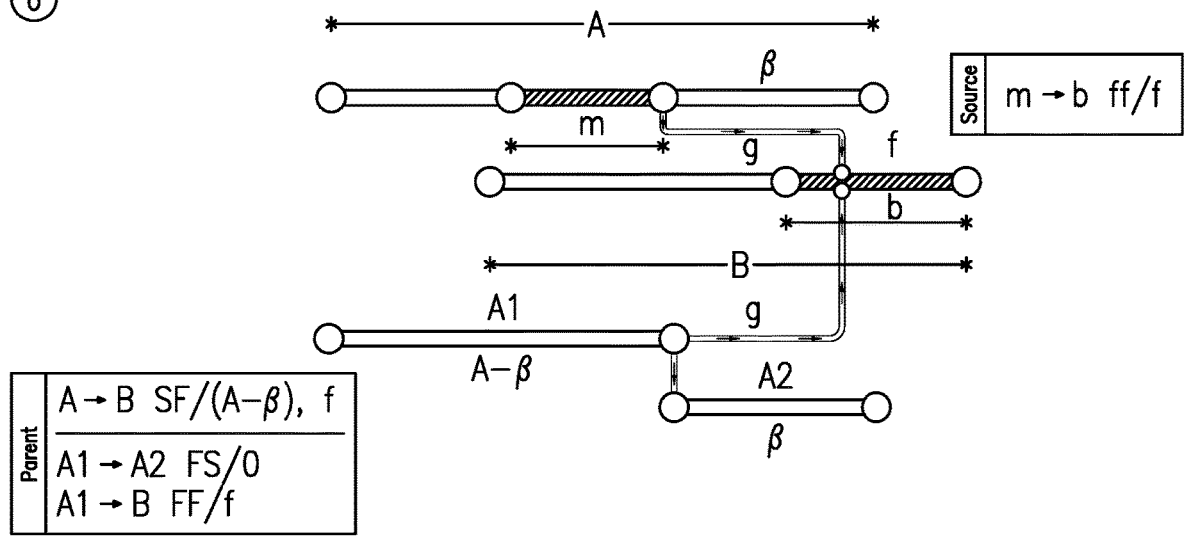
FIG.12

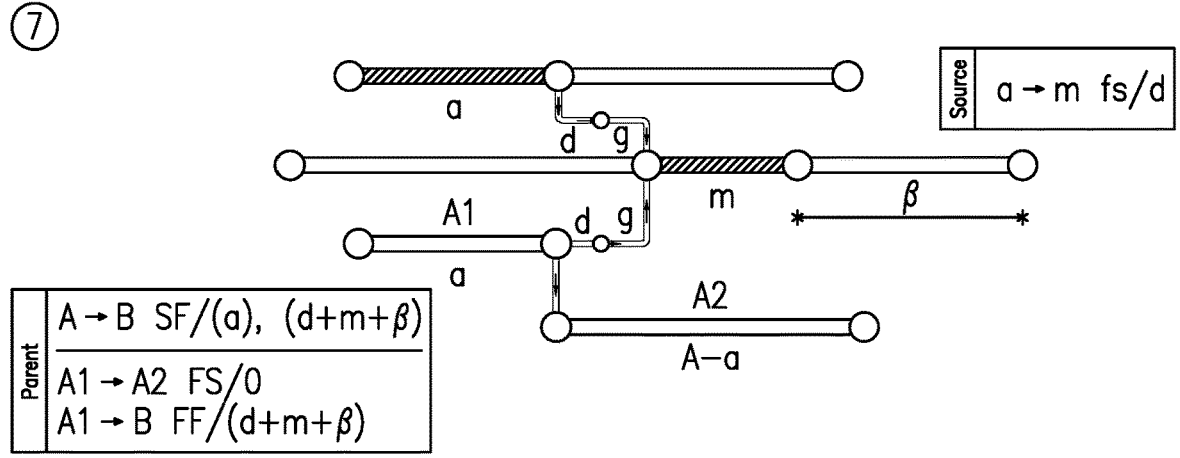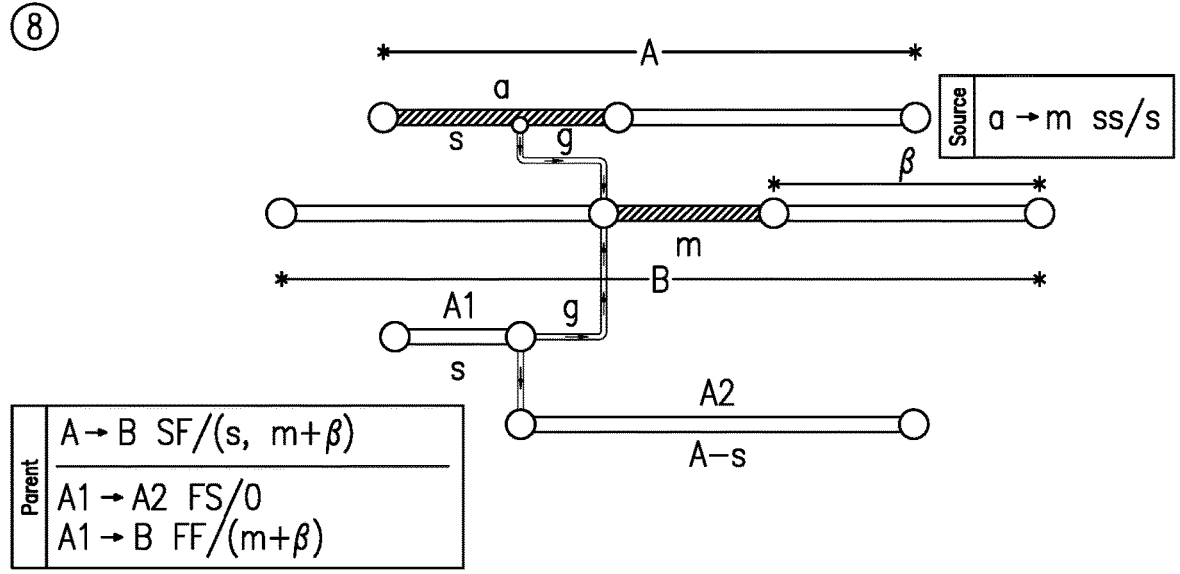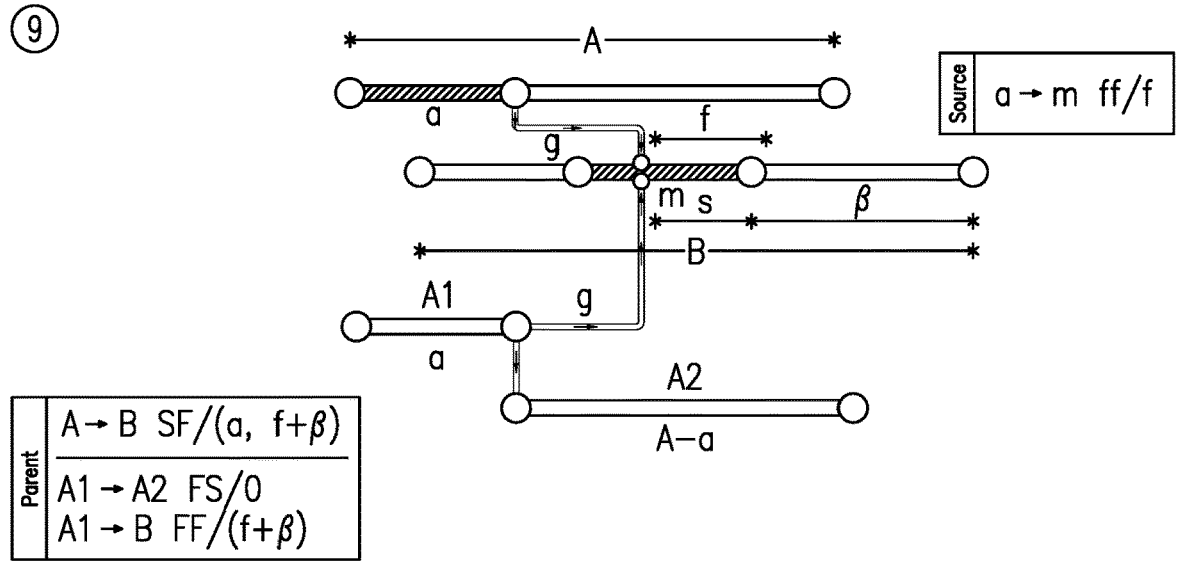
FIG.13

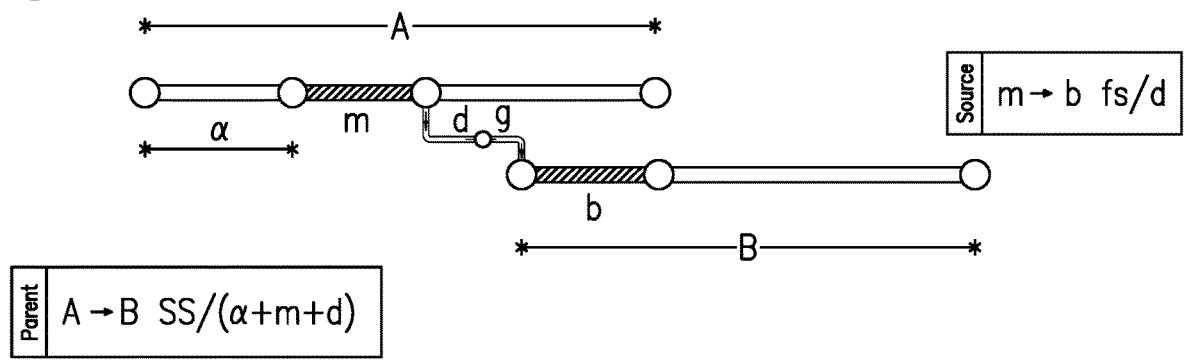
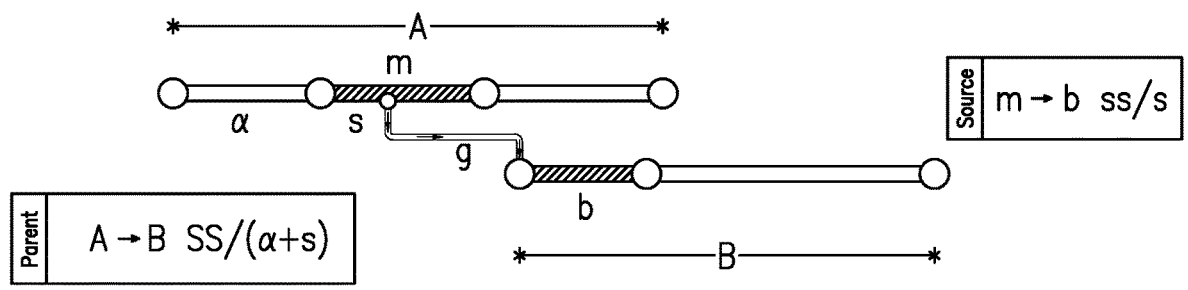
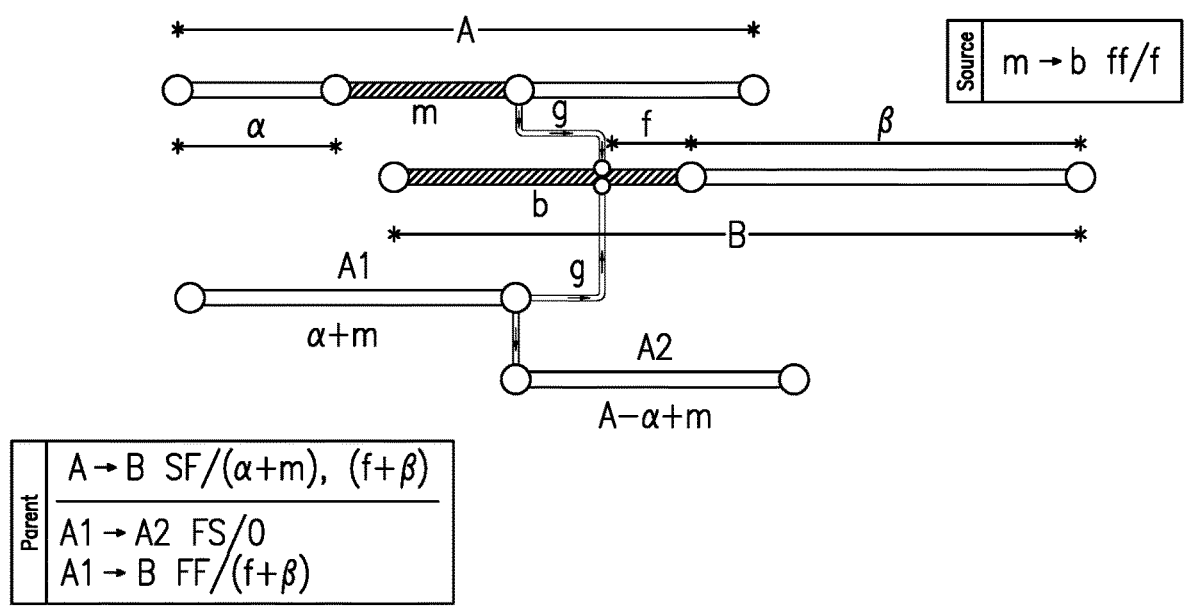
FIG.14

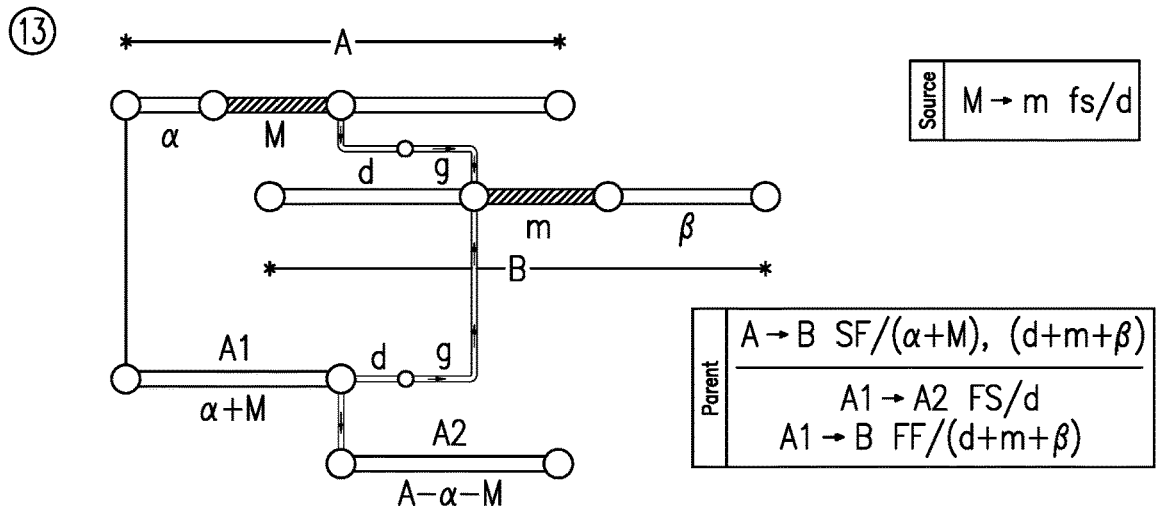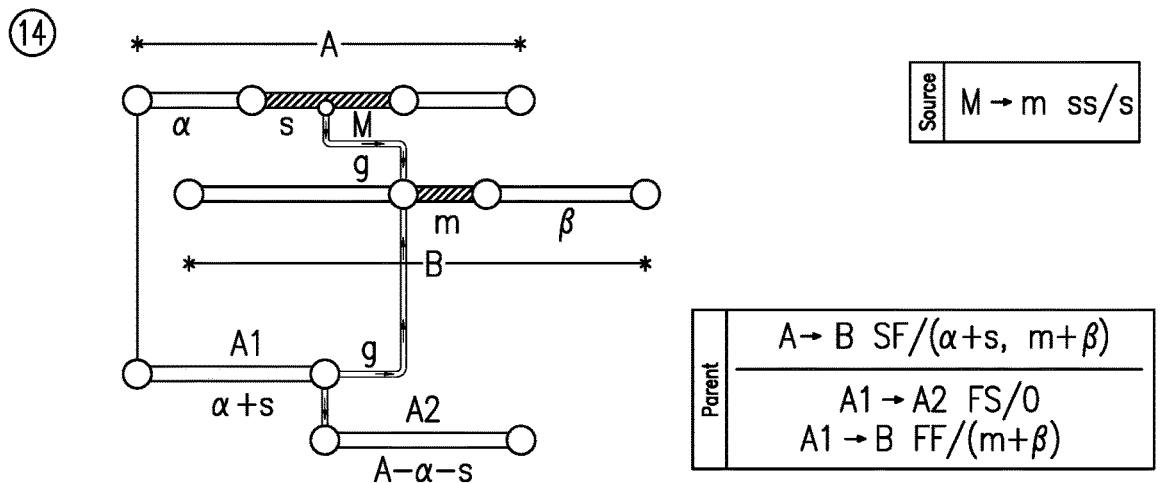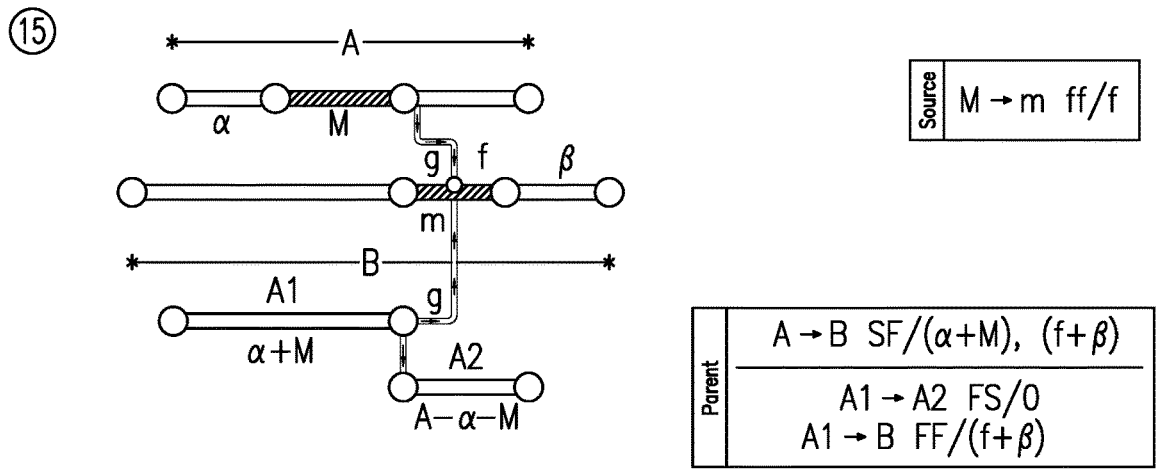
FIG.15

THE GRAPHICAL PATH METHOD ZOOMING UP CONCORDANT LINK ALGORITHM MIDDLE CHILD—(PART V)

| | LINK FROM *MIDDLE* TO *INTERMEDIATE CHILD* IN THE SOURCE SCHEDULE | | | | | | | | | PARENT ACTV'S | | *SUM-UP* LOGIC BETWEEN PREDECESSOR *PARENT* AND SUCCESSOR *PARENT* | | | |
|---|---|---|---|---|---|---|---|---|---|---|---|---|---|---|---|
| | PRED PARENT | | | SUCC PARENT | | | LINK IN SOURCE SCHDULE | | | PRED | SUCC | | | | |
| | Child | Dur | α | Child | Dur | β | Type | Offset | Gap | Dur | Dur | Type | Offset/Lag | Offset/Lag | Gap |
| 13 | MIDDLE | M | α | INTERM | m | β | fs | d | g | A | B | SF | α+M | d+m+β | g |
| | | | | | | | | | | A1 | A2 | Type | A1 Duration | A2 Duration | 0 |
| | | | | | | | | | | | | FS | α+M | A−α−M | |
| | | | | | | | | | | | | Type | Lag 1 | Lag 2 | Gap |
| | | | | | | | | | | | | FF | d+m+β | N/A | G6 |
| 14 | MIDDLE | M | α | INTERM | b | β | ss | s | g | A | B | SF | α+s | m+β | g |
| | | | | | | | | | | A1 | A2 | Type | A1 Duration | A2 Duration | Gap |
| | | | | | | | | | | | | FS | α+s | m+β | 0 |
| | | | | | | | | | | | | Type | Lag 1 | Lag 2 | Gap |
| | | | | | | | | | | A1 | B | FF | m+β | N/A | g |
| 15 | MIDDLE | m | α | INTERM | b | β | ff | f | g | A | B | SF | α+M | f+β | g |
| | | | | | | | | | | A1 | A2 | Type | A1 Duration | A2 Duration | Gap |
| | | | | | | | | | | | | FS | α+M | A−α−M | 0 |
| | | | | | | | | | | | | Type | Lag 1 | Lag 2 | Gap |
| | | | | | | | | | | A1 | B | FF | f+β | N/A | g |

α is days, using the middle activity calendar, from start of its parent activity to the start of middle child
β is days, using the intermediate activity calendar, from finish of intermediate child to finish of its parent activity Patent Pending—Not For Disclosure       ©2020–2021 PMA Consultants, LLC       3-Jul-21

FIG.16

SCHEDULE DENSITY ZOOMING

COPYRIGHT NOTICE

The copyright owner has no objection to the facsimile reproduction by anyone of the patent document of the patent disclosure but reserves all copyright rights whatsoever.

BACKGROUND

Scheduling a large project with many project activities is a complex endeavor. Once completed, the project schedule is used in project management and at various intervals to assess progress, identify problems, and make schedule adjustments as activities are completed and the schedule progress is updated.

The schedule can be classified into a pyramid of hierarchical levels, where the top level is a summary of the next lowest level, and so and so forth. For instance, level 1 at the top of the pyramid is the highest level, and level 5 at the bottom of the pyramid is the lowest level. In general, a "higher" level means less detail about individual schedule activities and "lower" level means more detail about individual schedule activities.

To produce these levels, the individual activities and milestones are associated with the levels by coding them to what are known as work breakdown structure (WBS) packages, hammocks, or grouping codes. These summarized schedules, however, are mere static bar charts and are devoid of total floats and the critical path/s because each summary group is shown as a bar without underlying logic that interconnects its associated activities with activities in other summary groups. The static nature and lack of underlying logic limit the utility of the summaries.

SUMMARY

An example of the present disclosure provides a strategy for an interactive and automated summarized schedule on a digital canvas that includes a hierarchy of logic-tied schedule densities generated from source schedule activities and for which there is the ability in real-time to zoom in/out among the hierarchy of logic-tied schedule densities. For example, the hierarchy of logic-tied schedule densities is generated in response to and as the timescale (e.g., grid spacing) is compressed or stretched. This permits users to "zoom in" and "zoom out" on the digital canvas to observe the schedule activities individually or at various levels of summary groups that are summed-up from underlying individual activities, all while maintaining logic-relationships between the summarized groups. For instance, as the user zooms out, individual activities (or intermediate summarized groups) snap into summary groups such that the individual activities (or intermediate summarized groups) become visually non-present on the digital canvas and the summary groups become visually present. Conversely, as the user zooms in, individual activities (or intermediate summarized groups) snap out of summary groups such that the individual activities (or intermediate summarized groups) become visually present on the digital canvas and the summary groups become visually non-present.

BRIEF DESCRIPTION OF THE DRAWINGS

This disclosure may be better understood with reference to the following drawings and description. The figures are not necessarily to scale, emphasis instead being placed upon illustrating the principles of the disclosure. In the figures, like referenced numerals designate corresponding parts throughout the different views.

FIG. 3 portrays a spreadsheet detailing the 12 sum-up logic patterns that arise where a parent start or finish child is linked to/from another parent start or finish child.

FIG. 4 portrays a spreadsheet detailing the sum-up SF link avoidance algorithm for cases where a parent start or finish child is linked to/from another parent start child and finish child.

FIG. 5 graphs the three sum-up logic patterns that arise where a parent finish child precedes another parent start child.

FIG. 6 graphs the three sum-up logic patterns that arise where a parent start child precedes another parent start child.

FIG. 7 graphs the three sum-up logic patterns that arise where a parent finish child precedes another parent finish child.

FIG. 8 graphs the three sum-up logic patterns that arise where a parent start child precedes another parent finish child.

FIG. 9 portrays a spreadsheet detailing the 12 sum-up logic patterns that arise where a parent start child or finish child is linked to/from another parent intermediate child.

FIG. 10 portrays a spreadsheet detailing the sum-up SF link avoidance algorithm for cases where a parent start or finish child is linked to/from another parent intermediate child.

FIG. 11 graphs the three sum-up logic patterns that arise where a parent finish child precedes another parent intermediate child.

FIG. 12 graphs the three sum-up logic patterns that arise where a parent intermediate child precedes another parent finish child.

FIG. 13 graphs the three sum-up logic patterns that arise where a parent start child precedes another parent intermediate child.

FIG. 14 graphs the three sum-up logic patterns that arise where a parent intermediate child precedes another parent start child.

FIG. 15 graphs the three sum-up logic patterns from/to a parent middle child and another parent intermediate child.

FIG. 16 portrays a spreadsheet detailing the sum-up SF link avoidance algorithm where a parent middle child is linked to/from another parent intermediate child.

DETAILED DESCRIPTION

A project schedule application allows a user to schedule activities associated with a project. For example, the application allows a user to input a network of activities, milestones, and "links" (logic ties connecting activities and milestones). The schedule application performs calculations using algorithmic rules and allows a user to generate an output display of the schedule.

Using algorithmic network rules, such as critical path method ("CPM") or graphical path method ("GPM"), a project schedule application calculates early start dates, early finish dates, late start dates, late finish dates, and total floats. Whereas CPM relies on forward pass (early dates)

and backward pass (late dates) algorithms to calculate total floats as activity late dates less early dates, GPM calculates total floats from link gaps.

A change to the schedule in a CPM application causes a complete recalculation of the entire schedule when the change/s is/are submitted. GPM embodies a paradigm shift from CPM in that GPM applications refresh the network information and the schedule display in a graphical rheonomic network on the computer or tablet screen synchronously as a user changes a schedule by adding and/or manipulating activities, links, milestones, and/or benchmarks.

Figure 1:
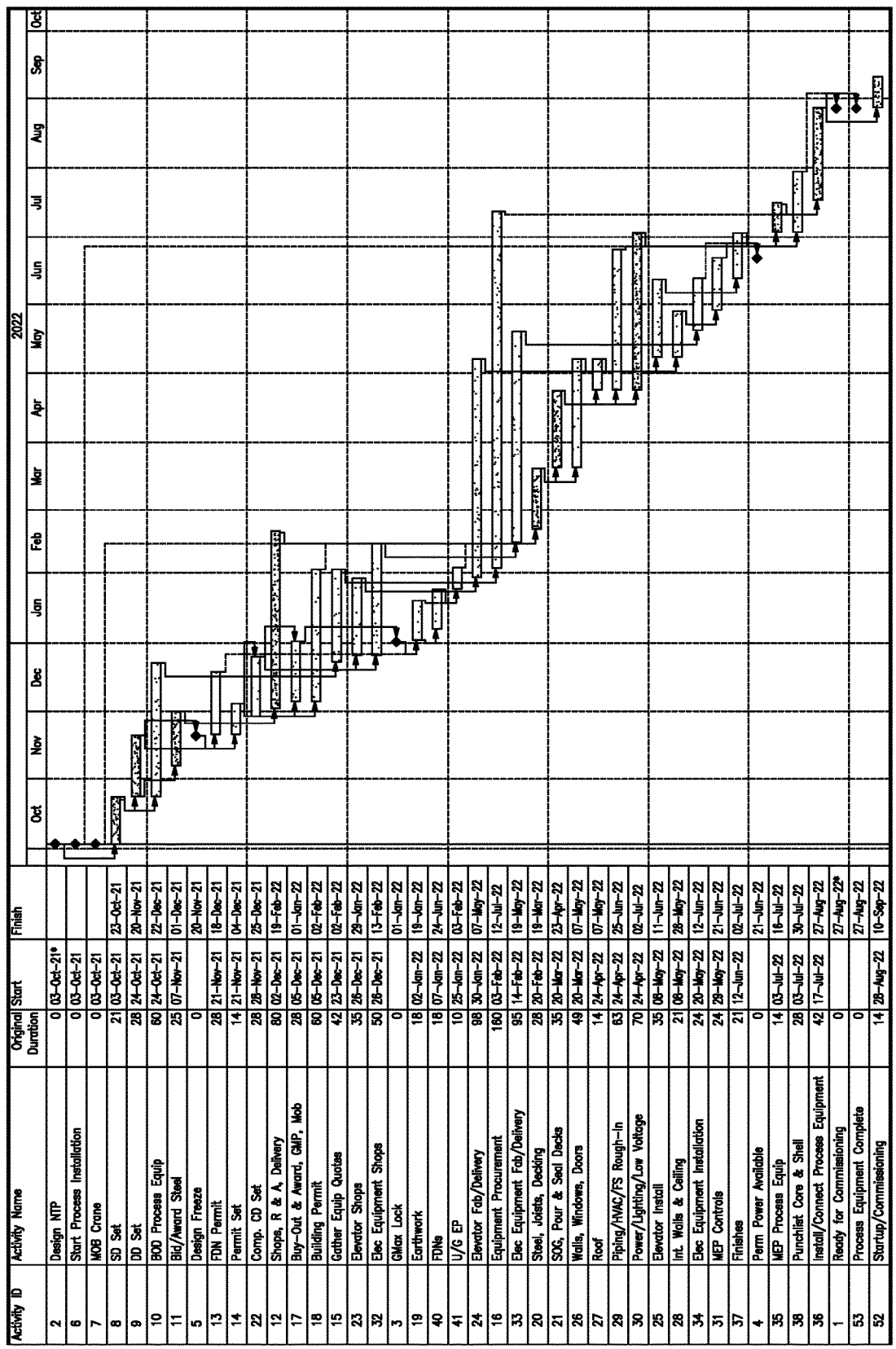
FIG. 1 illustrates an example of the bar chart display used by CPM applications.
Figure 2:
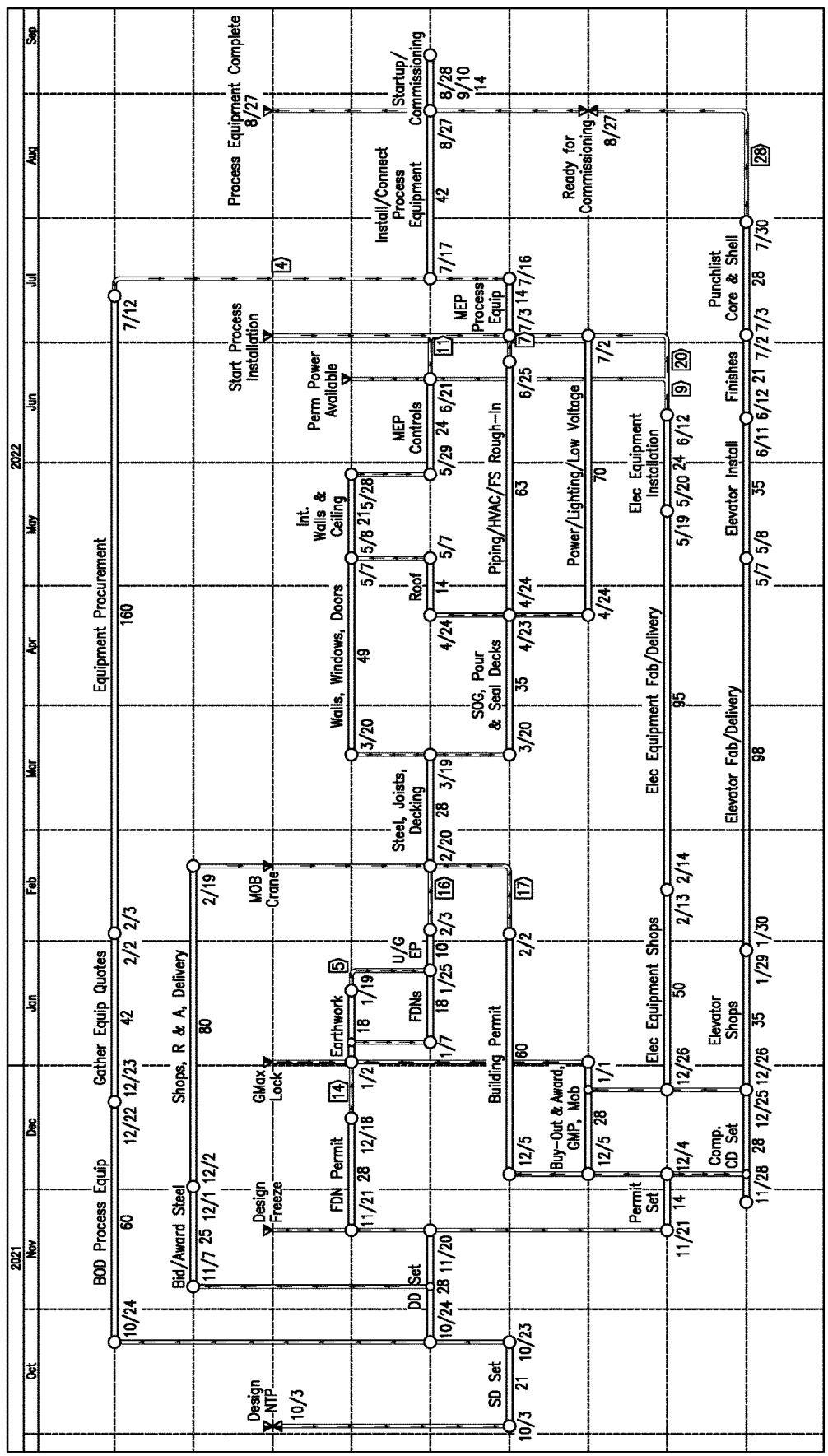
FIG. 2 illustrates an example of the network information displayed by the NetPoint GPM application in a time-dependent Logic Diagramming Method network layout.

Oracle Primavera/P6 and Microsoft Project/MSP are two well-known CPM schedule applications. An example of the bar chart display and print outs predominantly used by CPM applications is provided in FIG. 1. NetPoint,® NetRisk,™ and Project Summit™ are the only GPM schedule applications. An example of the activity/logic network information displayed in a time dependent graphical layout by the NetPoint GPM application is provided in FIG. 2.

Schedule applications allow detailed activities and milestones to be associated with summary and intermediate schedules by coding them to work breakdown structure packages (WBS), hammocks, or grouping codes (collectively referred to as "summary groups") associated with summary and intermediate schedule levels. Known summarized schedules, however, typically are mere static bar charts, devoid of total floats and the critical path/s, where each summary group is shown as a bar without logic that interconnects its associated activities.

A schedule application summarizing feature that "sums up" activities to summary groups provides vertical integration and traceability between the summarized and detailed schedules, as earliest start dates and latest finish dates of each activity grouping necessarily sum up to their respective higher-level summary groups. However, as links between individual activities do not sum up to higher-level summary groups, such summarized bar lacks horizontal traceability, cannot be used to perform schedule calculations using network rules, and are useless for conveying the plan to upper management and undertaking what-if analyses.

Revisions to a CPM schedule that become apparent when reviewing a summary static bar chart have to be carried out in the source schedule, each session requiring repeating CPM recalculating the entire summary static bar chart.

In this regard, the present GPM-based disclosure provides a strategy for an interactive and automated summarized schedule on a digital canvas that includes a hierarchy of logic-tied schedule densities generated from a source schedule activities and for which there is the ability in real-time to zoom in/out among the hierarchy of logic-tied schedule densities. For example, the hierarchy of logic-tied schedule densities is generated in response to and as the timescale (e.g., grid spacing) is compressed or summary groups are selected. The following definitions may be useful in understanding this disclosure.

activity: network object denoting a task that must be performed, a time-consuming schedule restraint, or a delay denoting the effect on timing from what was planned.

ad hoc zooming: generating in real-time a lower-density schedule, in whole or in part, as clusters of activities are selected by the user or the software, based on learned factors.

auto zooming: tool-less zooming up that occurs as the time scale or grid spacing is compressed if any fragnet is no longer discernible and, on the other hand, zooming back in to the higher-density fragnet that occurs if action on the time scale or grid spacing reverts to stretching.

benchmark: network object denoting a fixed start or completion event (occurs in an instant) that has zero total float, and that is used to model an overarching milestone.

digital canvas: computerized surface upon which the network schedule of graphical schedule objects and logic links are displayed.

cluster: schedule fragnet grouped into a lower-density activity in ad-hoc zooming.

concordant schedules: early start and late finish dates, total floats, links, gaps, critical paths, benchmarks, and milestones sum-up from the lower-level schedule into higher-level schedules.

critical path method (CPM): algorithm for scheduling a set of project activities that determines the longest path of activities and the time required to complete them from start to finish.

data date: date that splits an updated schedule between a statused (as-built) portion left of the data date and a forecasted portion right of the data date.

density: defines schedule hierarchical level of detail; a high-density (medium-density) schedule portrays, for the same scope of work, more activities than a medium-density (low-density) schedule.

density zooming: from a hierarchical source network schedule, generated concordant summary and intermediate network schedules, at designated schedule levels, or the next-lower-density network fragnet synchronously with and as the time scale or grid spacing is compressed or as clusters are selected.

drift: extent an activity may gain schedule (e.g., shift or extend backwards to an earlier position) without overriding network logic. For any activity, the sum of drift and float equals total float.

early (late) dates: earliest (latest) dates an activity may start/finish or a milestone may occur, as determined by the CPM forward pass (backward pass) and the GPM algorithms.

embedded node: a logic event intermediate of, or right on, the start or finish node of an activity, through which the activity is linked to another activity, a milestone, or a benchmark finish child: source activity that sets finish date of the parent activity grouping it (allowing for a tie-breaking rule).

finish-to-finish: finish of the predecessor activity allows a stated remaining portion of the successor activity to proceed to completion.

finish-to-start: finish of the predecessor activity and a waiting period, if any specified, allows the successor activity to start.

float: extent a positive-drift activity may be delayed beyond planned dates and not extend project completion; float equals total float for activities on early times.

fragnet: a selected group of activities and interconnecting logic links in a schedule.

gap, link gap: for two linked objects, extent the predecessor may be delayed and not impact the successor, and the successor may gain schedule and not impact the predecessor.

graphical path method (GPM): planning/scheduling method that serves as the engine behind graphical and visualization applications that, without a CPM forward pass or backward pass, kinetically both recalculates the schedule and refreshes the schedule display—only where impacted—synchronously as a user physically manipulates activities, logic ties, milestones, and benchmarks. Allowing activities to be scheduled on planned dates while retaining the ability to float back (drift in GPM lexicon), GPM calculates gaps, which are used to calculate late dates and float attributes. Total floats and the as-built critical path are calculated left of the data date.

hammock: summary object grouping source activities that hangs from a start and a finish activity and that spans between the start activity start date and the finish activity finish date.

hierarchical zooming: generate and maintain, at selected schedule levels, concordant, transposable summary and intermediate network schedules.

intermediate child: source activity that is not the start or finish child of its parent.

kinetic interface: display that refreshes the displayed schedule in real-time by recalculating activity, milestone, and benchmark date and float attributes in response to—and synchronously with—the physical manipulation of network objects by a user on the displayed schedule.

link or logic tie or logic-tied: network object drawn on the digital canvas as a directed edge line connecting two activities, an activity and a milestone or benchmark, two milestones, or a milestone and benchmark; dependency between two schedule objects, with or without an embedded node, and with or without a lag.

middle child: intermediate child with less total float than the start child and finish child (allowing for a tie-breaking rule).

milestone: network object denoting a start or completion instant event that, if linked and unrestrained by a date constraint, is controlled by the start or finish time of its linked activities.

network: flow graph of the schedule comprising rule-encoded activities, embedded nodes, milestones, and benchmarks, which are linked by designated predecessor-successor links.

network schedule objects; also objects or network objects: activities, logic ties, milestones, and benchmarks that are interconnected in a logic network.

parent: activity in the generated lower-density schedule, equivalent of a source work breakdown structure packages, hammocks, level codes, or cluster, and that is linked in the lower-density schedule through sum-up links to/from successors and predecessors.

parent overall duration: working days between parent start and finish date.

parent net duration: overall duration less any gap periods.

rheonomic network: network schedule flow graph with a time-scaled layout. The opposite is a sclamonic network that lays out activities without considering time as a variable.

source schedule: detailed, hierarchical network schedule from which a lower-density, concordant network schedule may be generated.

start child: source activity that sets start date of the parent activity grouping it (allowing for a tie-breaking rule).

start-to-start: completing a stated start portion of the predecessor activity allows the successor activity to start.

start-to-finish: completing a stated portion of the predecessor activity (aka start offset) allows a stated remaining portion of the successor activity (aka finish offset) to proceed.

sum-up or sum-up logic: source child activities having logic links that are integrated into summarized parent activities such that parent activities are logic-tied to each other via the logic links of the child activities; visually on the digital canvas the child activities "snap" into the parent activity of the next, lower-density level when the time scale is compressed such that the child activities are no longer individually visually present, and the child activities "snap" out of the parent activities of the lower-density level when the time scale is stretched such that the child activities are again individually visually present on the digital canvas.

total float (TF): extent an activity may be delayed beyond early dates and not delay completion; also, combined extent an activity on planned dates may be delayed and gain schedule and neither delay completion nor force an earlier project start or interim release date, respectively.

work breakdown structure (WBS): hierarchical decomposition of the scope of a project into mutually exclusive elements or components.

zooming in: swapping the schedule or fragnet on the canvas to a higher-density concordant network schedule or fragnet counterpart. Zooming out is the opposite of zooming in.

zooming up: act of machine generating a lower-density, concordant network schedule.

The disclosed examples may include or may be implemented in a scheduling system that has one or more microprocessors that are configured to operate with a screen display and graphical user interface. The microprocessor may include software, hardware, or both, and may be further subdivided or combined in one or more other microprocessors, control modules, or the like. The scheduling system is operable to execute a computer application encoded in non-transitory computer-readable media. The application contains instructions that, when executed, are operable to carry out the methodologies and functions described in this disclosure. Thus, the system or module is understood to incorporate the capabilities of the application, and the application is understood to incorporate the methodologies and functions herein.

The system may be implemented in one or more computer programs executing on one or more programmable systems comprising at least one processor and at least one data storage system. Each program may be implemented in any desired computer language to communicate with a computer system. The system may also include a computing network that enables communication and exchange of data, including any communication method by which information may travel between computing devices. The network may include one or more of a wireless or wired network, a local or wide area network, a direct connection such as through a Universal Serial Bus port, and the set of interconnected networks that make up the Internet, an Intranet, or other distributed computing network.

Schedulers presently focus their efforts on detailed network schedules and rely on non-logic-linked hammock bar chart displays to ascertain summary and intermediate activity start and finish dates. For instance, as a rule of thumb, for construction contracts ranging from $50 M to $250 M, the detailed (level 3) schedule may typically comprise 175 to 350 activities per $10 M (i.e., 5,000 activities for a $250 M contract). However, because hammock bar charts are devoid of logic from one hammock bar chart to the next, schedulers have little choice but to cobble together static schedule summaries from massive detailed schedules when, for example (a) visually explaining to stakeholders schedule issues needing resolution; (b) building summarized schedule models for risk assessments; (c) performing observational delay analyses; (d) engaging non-scheduling stakeholders in re-planning to recover delay; and (e) attaching a summary schedule in monthly progress reports. Moreover, the creation of static schedule summaries must be repeated if the source schedule is revised. Additionally, as there is no standard, schedule summaries often differ between schedulers.

The meaning of "detailed" and "summary" in terms of a complex schedule has evolved along two parallel tracks. One approach is to classify a schedule via hierarchical level. Level 1 (top of the pyramid) is the highest level, and level 5 (bottom) is the lowest level, where "higher" level means less detail. A second approach is to classify a schedule by its density, where level 1 is the lowest density and "lower" density means less detail of individual activities. Higher-level schedules portray less detailed activities. A level 1 schedule is the most summarized network schedule and a level 4 schedule is the most detailed network schedule. Higher-level schedules are lower-density schedules. A level 1 schedule is the lowest-density schedule and a level 4 schedule is the highest-density schedule. Schedule levels 0-3 portray the entire scope of the project; a level 4 schedule often expands a portion of the level 3 schedule activities by areas, trades, or systems.

The present GPM-based disclosure provides a strategy for an interactive and automated summarized schedule on a digital canvas including a hierarchy of logic-tied schedule densities generated from a source schedule and for which there is the ability in real-time to zoom in/out among the hierarchy of logic-tied schedule densities. For example, multilevel concordant network schedules or a lower-density concordant network schedule are generated as the timescale or grid spacing is compressed or clusters are selected. Further, it is possible to navigate between schedule hierarchical levels. For example, to zoom out, it is possible to use the graphic tool to swap the schedule on the canvas to a lower-density schedule, click on −(minus) on a +/−tool, or use the auto zoom-out feature. To zoom in, it is possible to use the graphic tool to swap the schedule on the canvas to a higher-density schedule, click on +(plus) on the +/−tool, or use the auto-zoom in feature.

Concordance requires both date and logic integration versus mere date integration. For example, in a hierarchy of schedules, vertical integration and traceability require that the earliest start/latest finish of detailed activities sum-up to summarized activities' early start/late finish dates and that detailed events sum up properly to higher-level events. They do not, however, require that logic between detailed activities sums up to the summarized activities. Early start dates, late finish dates, drifts, floats, total floats, links, gaps, critical paths, near-critical paths, benchmarks, and milestones sum up in concordant summarized network schedules.

The present disclosure allows a flexible density zooming scheme, e.g., WBS packages, hammocks, grouping codes, or clusters ("summary groups") underlie parent activities. Whereas a one-to-one link between summary groups and a schedule level is common, using a WBS package layout when zooming occurs automatically as either the time-scale or grid-spacing is compressed or stretched requires stating which summary group level corresponds to which schedule level. A parent obtains its code/description from the associated density zooming scheme (e.g., hammocks).

The present disclosure utilizes a density zooming up options interface that permits the user to: (a) modify the base-level hierarchy and activate sections in the graphic tool; (b) link source activities with an open start node and/or open finish node; (c) assign any orphan source activity to the appropriate summary group; (d) assign to each parent the working day calendar of its start child or accept a user input instead; (e) code source milestones and benchmarks to summary groups; and/or (f) for swim lanes, associate summary groups and schedule levels (e.g., WBS level 3 corresponds to the Level 1 schedule).

The present disclosure allows a flexible zoom up concordant activity algorithm, by way of example: (a) generating parent activities based on whether the summary group is the selected vertical integration scheme; (b) for every parent, identifying the source activity with the latest early finish date; (c) making parent start and finish dates that fall left of the data date actual dates; (d) for every parent, the source activity with the earliest early start date (or if two or more source activities share the earliest early start date, by way of example, the source activity of least total float) is the start child; (e) for every parent, the source activity with the latest early finish date (by way of example, the source activity of least total float if more than two such source activities share the latest early finish date) is the finish child; (f) the least-gap predecessor and least total float predecessor (if different) or predecessors, if other predecessors have equal least total float, are associated with each start child; (g) the least gap successor and least total float successor (if different) or successors, if other successors have equal least total float links/successors, are associated with each finish child; (h) for every parent with a middle child, the least total float predecessor and least total float successor is associated with the middle child; and (i) for every parent, notable intermediate child/children, if any, are identified. Further, on request, each parent's start child, finish child, and middle child, and associated sum-up links are displayed on a spreadsheet.

The sum-up concordant logic tie algorithm replicates in the lower-density schedule primary key links from the source schedule, as identified by the concordant activity algorithm, comprising links from/to a parent start child, finish child, or intermediate child and another parent start child, finish child, or intermediate child. For the eight sum-up link combinations among a parent's start, finish, and intermediate child and another parent start, finish, and intermediate child, and FS, SS, and FS links in the source schedule, twenty-four sum-up logic patterns may arise. FIG. 3 shows twelve logic patterns where a parent start or finish child is linked to/from another parent start or finish child. As SF links are typically not used and are disfavored, FIG. 4 shows an avoidance algorithm where a parent start or finish child is linked to/from another parent start or finish child in order to avoid SF links. FIGS. 5-8 illustrate graphs of the twelve sum-up logic patterns. That is, the graphic display of the selected sum-up logic pattern reflects the underlying logic.

FIG. 9 shows the twelve sum-up logic patterns that arise where a parent start or finish child is linked to/from another parent intermediate child. FIG. 10 shows a spreadsheet with the SF link avoidance algorithm where a parent start or finish child is linked to/from another parent intermediate child. FIGS. 11-14 graph each of the respective 12 logic patterns corresponding to a start or finish child linked to/from another parent intermediate child.

A link from a parent intermediate child to another parent intermediate child is only relevant if one intermediate child is also a middle child or both intermediate children are middle children. FIG. 15 shows that the three logic patterns from/to a parent middle child and another parent intermediate child all sum up as SF links. FIG. 16 illustrates the SF avoidance algorithm.

The present disclosure utilizes a sum-up logic algorithm comprising the following processes: (a) sorting parent activities by early start date (ascending order); (b) in summing up key links, allowing the option to ignore links with gaps exceeding a gap threshold; (c) generating sum-up links where a parent start child or finish child is linked to/from another parent start child or finish child; (d) generating key primary sum-up links where a parent start child or finish child is linked to/from another parent intermediate child; and (e) generating key secondary sum-up links where a parent middle child is linked to/from another parent intermediate child.

As the time scale is compressed, displayed fragnets, when no longer discernible, auto zoom out into (i.e., snap into) the next lower-density schedule activity or fragnet. If action on the time-scale changes to stretching, as previously zoomed out activities or fragnets once again become discernible, they zoom back in (i.e., snap out of) from the lower-density schedule to their originating higher-density fragnets.

Figure 17:
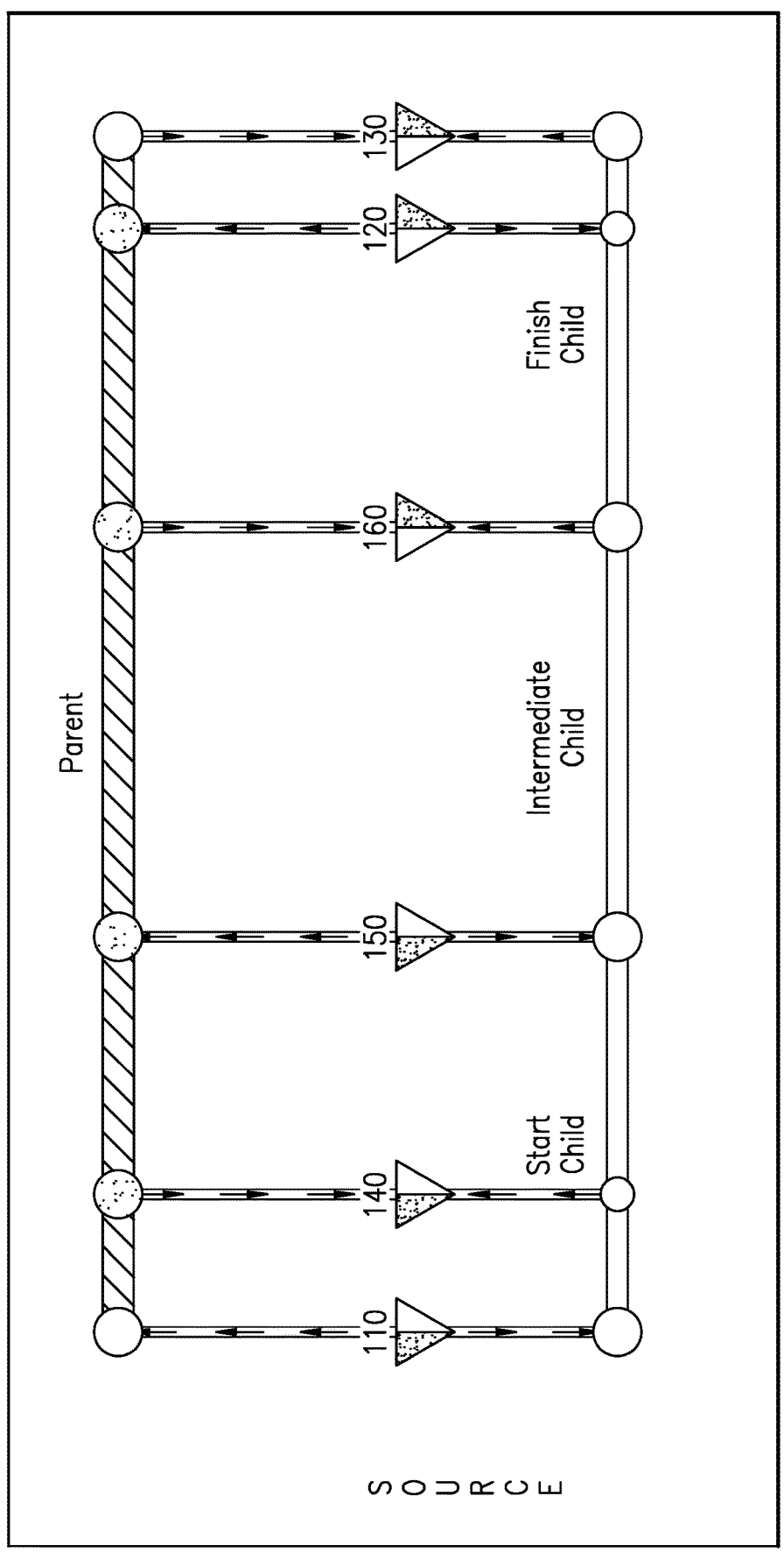
FIG. 17 is an example block diagram detailing sum-up links for milestones and benchmarks.

FIG. 17 diagrams an example process of the zoom up milestone and benchmark processor. At 110, a source schedule event preceding a start child is linked to the start of the parent. At 120, a source schedule event preceding a finish child is linked to a finish embed offset the finish child duration from the parent's finish such that sum up gap equals source gap. At 130, a source schedule event succeeding a finish child is linked from the finish of the parent. At 140, a source schedule event succeeding a start child is linked to an embed offset the start child duration from the parent's start, such that sum-up gap equals source gap. At 150, a source schedule event preceding an intermediate child is linked to an embed in the parent at the start of the intermediate child, such that sum-up gap equals source gap. And at 160, a source schedule event succeeding an intermediate child is linked from an embed in the parent at the finish of the intermediate child, such that sum-up gap equals source gap.

In further examples, the present disclosure allows the following zoom options: (a) display parent overall duration, net duration, or both; (b) calculate minimum float for parent activities; (c) within any parent bar, highlight the duration, and when hovering the pointer over the bar, display the description of the middle child, if any, and the description of any intermediate child with duration ≥40% of the parent net duration; (d) display parent activity bar "necked" during gap periods; (e) set critical path total float threshold and parent bar color (e.g., red if TF≤5) and near-critical path total float threshold and bar color (e.g., yellow if TF≤20); and (f) apply color, if any, to every child, in whichever parent subsumed, that is a critical activity in the source schedule.

In a further embodiment of any of the foregoing examples, the method includes: from a source network schedule, algorithmically generating summary and intermediate concordant network schedules or the next-higher-level concordant network schedule as the timescale or grid spacing is compressed or clusters are selected, rendering navigating between schedule levels effortless. Summarized activities aka parents group source activities according to the selected vertical integration scheme (e.g., work breakdown structure (WBS) level, hammocks, etc.). For any parent, the activity with the earliest early start date (tie-breaking rule included) is the start child, the activity with the latest early finish date (tie-breaking rule included) is the finish child, and the intermediate activity with less total float than the start child and finish child (tie-breaking rule included), if any, is the middle child. The method associates with each start child its key predecessor/s (e.g., least-gap predecessor and/or least TF predecessor), with each finish child, its key successor/s (e.g., least-gap successor and/or least TF successor), and with each middle child its key predecessor and key successor (e.g., least TF).

In a further embodiment of any of the foregoing examples, the method includes: a user-interaction feature acting on a graphic tool with a section per schedule level (each section denoting existence or not of a schedule at that level and whether original or zoomed up) is used to generate a zoomed-up schedule.

In a further embodiment of any of the foregoing examples, the method includes: with a source network schedule on the canvas, as the time scale or grid spacing is compressed and then stretched, and activity/logic detail is no longer discernible or once again discernible, algorithmically generating and swapping display to the next-higher-level fragnet and then reverting to the next lower-level source fragnet.

In a further embodiment of any of the foregoing examples, the method includes: algorithmically generating and displaying the selected lower-density schedule, in whole or in part, as clusters are selected.

In a further embodiment of any of the foregoing examples, the method includes: navigating between schedule levels as the time scale or grid spacing is compressed and then stretched, navigating by using the graphic tool, and navigating through a zoom out (−) and zoom in (+) graphic feature docked on the canvas.

In a further embodiment of any of the foregoing examples, the method includes, by way of example: preceding zooming up by linking unlinked source activities, ignoring source links based on a gap threshold, assigning to each parent the calendar of its start child or allowing input instead, coding any orphan source activity to the appropriate zooming-up scheme, and relating WBS levels and schedule levels.

In a further embodiment of any of the foregoing examples, the method includes: algorithmically generating sum-up links where (a) a start child or finish child is linked from/to another parent start child or finish child, (b) a start child or finish child is linked from/to another parent intermediate child, and (c) a middle child is linked to/from another parent intermediate child. If source schedule link types include finish-to-start (FS), start-to-start (SS), and finish-to-finish (FF) logic, the method generates a sum-up link as FS, SS, FF, or start-to-finish (SF), and ensures sum-up gaps equal the respective source gaps. To avoid sum-up SF links, the method splits the predecessor parent into a start parent and a finish parent, FS links the start parent to the finish parent, and FF links the start parent to the successor parent.

In a further embodiment of any of the foregoing examples, the method includes: for milestones and benchmarks that sum up to a schedule level, algorithmically generating sum-up links, where (a) each event preceding a start child is linked to the start of the parent; (b) each event preceding a finish child is linked to an embed offset the finish child duration from the parent activity's finish date, such that sum up gap equals source gap; (c) each event succeeding a finish child is linked from the finish date of the parent; (d) each event succeeding a start child is linked to an embed offset the start child duration from the parent start, such that sum up gap=source gap; (e) each event preceding an intermediate child is linked to an embed in the parent offset at the start date of the intermediate child, such that sum up gap equals source gap; and (f) each event succeeding an intermediate child is linked from an embed in the parent offset at the finish date of the intermediate child, such that sum up gap equals source gap.

In a further embodiment of any of the foregoing examples, the method includes: where any two schedules are original schedules, comparing a manually updated higher-level schedule to a "what-if" zoomed up update of the lowest-level original schedule and highlighting non-concordant attributes for corrective action.

In a further embodiment of any of the foregoing examples, the method includes: distinguishing between parent overall duration and net duration; calculating minimum float for parent activities; when hovering with the mouse over a parent, highlighting duration and displaying description of any middle child and any intermediate child with duration ≥40% of the parent net duration; displaying activity bar necked for gap periods; and setting critical path and near-critical path total float threshold colors.

In a further embodiment of any of the foregoing examples, the method includes generating and displaying concordant summary and intermediate schedules, at designated schedule levels, or as the timescale or grid spacing is compressed or clusters are selected.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method comprising:
   converting source child activities in a network schedule of graphical schedule objects into an interactive summarized schedule that has a hierarchy of schedule densities on a time-scaled graph and displayable on a digital canvas, the hierarchy of schedule densities including intermediate activities each of which is a sum-up of logic links of a different group of the source child activities and the intermediate activities are visually logic-tied to each other on the digital canvas, and parent activities each of which is a sum-up of logic links of a different group of the intermediate activities and the parent activities are visually logic-tied to each other on the digital canvas; and
   zooming in and out on the time-scaled graph among the hierarchy of schedule densities on the digital canvas, wherein
   when the time-scaled graph with the source child activities is time-compressed (zoom out): the source child activities snap into the intermediate activities such that the source child activities become visually non-present on the digital canvas and the intermediate activities become visually present on the digital canvas,
   when the time-scaled graph with the intermediate activities is time-compressed (zoom out) the intermediate activities snap into the parent activities such that the intermediate activities become visually non-present on the digital canvas and the parent activities become visually present on the digital canvas,
   when the time-scaled graph with the parent activities is time-stretched (zoom in) the intermediate activities snap out of the parent activities such that the intermediate activities become visually present on the digital canvas and the parent activities become visually non-present, and
   when the time-scaled graph with the intermediate activities is time-stretched (zoom in) the source child activities snap out of the intermediate activities such that the source child activities become visually present on the digital canvas and the intermediate activities become visually non-present.

2. The method as recited in claim 1, wherein each different group of the source child activities is mutually exclusive.

3. The method as recited in claim 1, further comprising a user graphic tool with section representing each of the hierarchy of schedule densities, each said section denoting existence or not of an interactive summarized schedule for each of the hierarchy of schedule densities.

4. The method as recited in claim 1, further comprising permitting a user to navigate among the hierarchy of schedule densities using the multilevel graphic tool including a zoom out (−) and zoom in (+) graphic feature on the digital canvas.

5. The method as recited in claim 1, wherein for each of the parent activities and each of the intermediate activities, the one of the source child activities with an earliest early start date is a start child, the one of the source child activities with a latest early finish date is the finish child, and the one of the source child activities with less total float than the start child and finish child is a middle child, and associating with each start child its least-gap and/or least total float predecessors, with each finish child its least-gap and/or least total float successor, and with each middle child, if existing, its least total float predecessor and least total float successor.

6. The method as recited in claim 5, wherein, when the time-scaled graph with the parent activities or the intermediate activities is time-stretched, unlinked source child activities are linked, ignoring links of source child activities that are based on a gap threshold, assigning to each of the parent activities a calendar of its start child or allowing a user input instead, and coding any orphan ones of the source child activities to one of the groups of the source child activities.

7. The method as recited in claim 5, wherein the start child or the finish child of one of the parent activities is linked to/from the start child or finish child of another of the parent activities.

8. The method as recited in claim 7, wherein the start child or the finish child of one of the intermediate activities is linked to/from the start child or the finish child of another of the intermediate activities.

9. The method as recited in claim 8, wherein the middle child of one of the parent activities is linked to/from the middle child of another of the parent activities.

10. The method as recited in claim 9, wherein the middle child of one of the intermediate activities is linked to/from the middle child of another of the intermediate activities.

11. The method as recited in claim 5, wherein each of the source child activities that precedes either one of the intermediate activities or one of the parent activities is linked to the start child of the one of the intermediate activities or one of the parent activities.

12. The method as recited in claim 11, wherein each of the source child activities preceding the finish child of one of the parent activities is linked to an embed offset based on a duration of the finish child such that a gap of the one of one of the parent activities equals a gap of the source child activities.

13. The method as recited in claim 11, wherein each of the source child activities succeeding the finish child of one of the parent activities is linked from the finish child.

14. The method as recited in claim 11, wherein each of the source child activities succeeding the start child of one of the parent activities is linked to an embed offset based on a duration of the start child such that a gap of the one of one of the parent activities equals a gap of the source child activities.

15. The method as recited in claim 11, wherein each of the source child activities preceding the finish child of one of the intermediate activities is linked to an embed offset in one of the parent activities based on a start date of such that a gap of the one of one of the parent activities equals a gap of the source child activities.

16. The method as recited in claim 5, further comprising distinguishing between overall duration of the parent activities in working days between a parent start date and a parent finish date and a parent net duration of a difference between overall duration and any gap periods, calculating a minimum float for each of the parent activities, on the digital canvas highlighting the overall duration, and when hovering with cursor over one of the parent activities, displaying a description of the middle child, if any, and the description of any of the intermediate activities therein with a duration of 40% or more of the net duration, for each of the parent activities displaying on the digital canvas a parent activity bar, wherein the parent activity bar is necked for gap periods.

17. A schedule system comprising:
an interactive summarized schedule and that has a hierarchy of schedule densities on a time-scaled graph on a digital canvas, the hierarchy of schedule densities including intermediate activities each of which is a sum-up of logic links of a different group of the source child activities and the intermediate activities are visually logic-tied to each other on the digital canvas, and parent activities each of which is a sum-up of logic links of a different group of the intermediate activities and the parent activities are visually logic-tied to each other on the digital canvas; and
the interactive summarized schedule is time-expandable and time-contractible to zoom in and out on the time-scaled graph among the hierarchy of schedule densities on the digital canvas, wherein
when the time-scaled graph with the source child activities is time-compressed (zoom out): the source child activities snap into the intermediate activities such that the source child activities become visually non-present on the digital canvas and the intermediate activities become visually present on the digital canvas,
when the time-scaled graph with the intermediate activities is time-compressed (zoom out) the intermediate activities snap into the parent activities such that the intermediate activities become visually non-present on the digital canvas and the parent activities become visually present on the digital canvas,
when the time-scaled graph with the parent activities is time-stretched (zoom in) the intermediate activities snap out of the parent activities such that the intermediate activities become visually present on the digital canvas and the parent activities become visually non-present, and
when the time-scaled graph with the intermediate activities is time-stretched (zoom in) the source child activities snap out of the intermediate activities such that the source child activities become visually present on the digital canvas and the intermediate activities become visually non-present.

18. The system as recited in claim 17, wherein for each of the parent activities and each of the intermediate activities, the one of the source child activities with an earliest early start date is a start child, the one of the source child activities with a latest early finish date is the finish child, and the one of the source child activities with less total float than the start child and finish child is a middle child, and associating with each start child its least-gap and/or least total float predecessors, with each finish child its least-gap and/or least total float successor, and with each middle child, if existing, its least total float predecessor and least total float successor.

19. The system as recited in claim 18, wherein, when the time-scaled graph with the parent activities or the intermediate activities is time-stretched, unlinked source child activities are linked, ignoring links of source child activities that are based on a gap threshold, assigning to each of the parent activities a calendar of its start child or allowing a user input instead, and coding any orphan ones of the source child activities to one of the groups of the source child activities.

20. The system as recited in claim 18, wherein the start child or the finish child of one of the parent activities is linked to/from the start child or finish child of another of the parent activities.

* * * * *